United States Patent Office 2,972,406
Patented Feb. 21, 1961

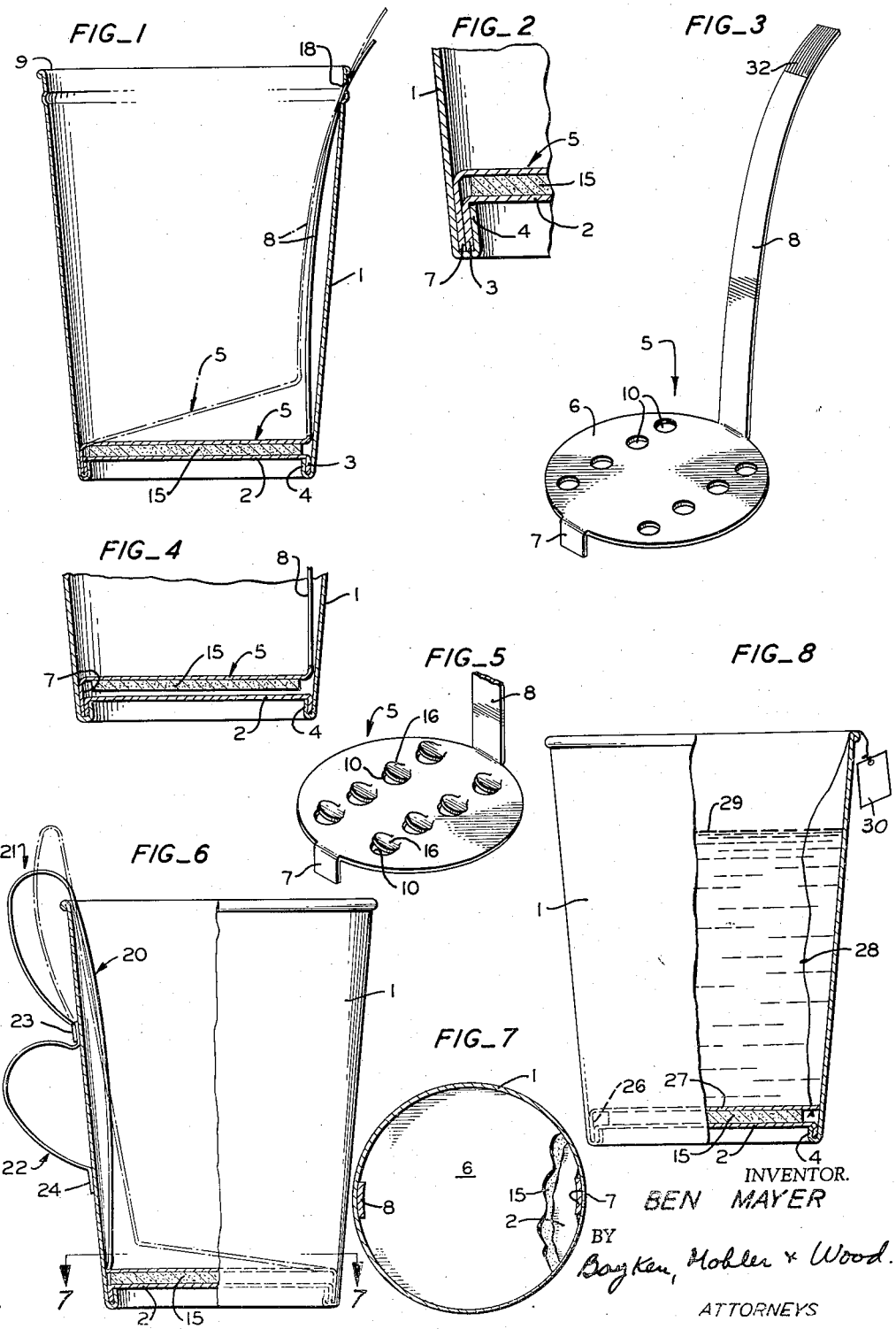

2,972,406

CONTAINER WITH MIXING ATTACHMENT

Ben Mayer, 2524 Prosser Ave., Los Angeles, Calif.

Filed Oct. 14, 1957, Ser. No. 690,027

6 Claims. (Cl. 206—47)

This invention relates to containers and more particularly to an attachment adapted to permit mixing the contents of a container such as a cup.

Heretofore it has been proposed to provide a compartment at the bottom of a container whereby a charge of soluble material such as ingredients of a drink may be received therein so that the drink may be completely prepared merely by the addition of water or any other suitable liquid base. An example of such a device is shown in U.S. Letters Patent No. 1,933,468 to Abbot, dated October 31, 1933.

The Abbot patent and others directed to a somewhat similar object (for example Epperson, 1,709,168 and Serr, 1,889,111) have also suggested the provision of a cover element adapted to overlie the charge of material to exclude impurities and retain the contents in a sanitary condition. The cited patents also propose the use of a handle integrally secured to the cover and extending upwardly therefrom to within easy reach of the fingers of a user to facilitate removal of the cover.

In such prior device the handle may also function as a stirrer for stirring or mixing the contents of the cup after the liquid has been added.

One disadvantage of such devices is that the handle portion used for stirring the contents of the cup has already become soiled, or at least unsanitary, by contact with the fingers of the users. At least one patentee (Epperson) forms the cover element and handle so that the cover may serve as the paddle or working portion of the device, but this requires that the device be doubled on itself so that it becomes unsanitary.

One of the objects of this invention is the provision of a container having a cover attachment for maintaining a charge of material on the bottom of the cup in a hygienic condition and which attachment overcomes the above noted disadvantage of prior art devices when the attachment is used as a stirrer.

Another, and the most important object of the invention, is the provision of a novel stirring or mixing device adapted to be used with a container for stirring, mixing or otherwise agitating the contents thereof.

Still another object of the invention is the provision of a cover for a charge of material in a container which lends itself to use as a mixing device without removal from said container.

Yet another object of the invention is the provision of a container having a charge of soluble material therein and a built-in mixing attachment arranged so as not to interfere with stacking a plurality of such containers in the customary manner.

Other objects and advantages will be seen from the following specification and drawings.

Fig. 1 is a vertical cross section through a conventional paper cup showing one form of the invention.

Fig. 2 is a greatly enlarged cross section of a corner of a cup showing one method of securing the hinge portion of the stirring device thereto.

Fig. 3 is a perspective of the stirring device.

Fig. 4 is a vertical cross section through the lower portion of a cup showing an alternative method of applying the soluble material.

Fig. 5 is a perspective of a modified form of the paddle portion of the stirring device.

Fig. 6 is a side elevation of a cup partially broken away and in section showing another form of handle.

Fig. 7 is a horizontal cross section through a cup showing still another form of paddle and showing the manner in which the hinge portion is inserted between the bottom flange and the sidewall.

Fig. 8 is a vertical cross section through a cup and its liquid contents showing another form of stirring device.

In detail, and referring to Fig. 1, the invention is shown in the drawings embodied in a conventional paper cup having frusto-conical sidewalls 1 and a bottom 2. Bottom 2 is provided with an annular downwardly extending peripheral flange 3 and the lower margin of the sidewalls 1 is bent upwardly around flange 3 to provide an inner annular flange 4 (Fig. 2), thereby effecting a liquid tight joint.

By the present invention a mixing device generally designated 5 of semi-rigid material such as paper board or the like (Fig. 3) is incorporated within the container as shown in Fig. 1. This mixing device comprises a paddle-like mixing element 6 which is preferably generally circular in shape and is of a diameter slightly smaller than the diameter of the bottom 2 of the cup. Integral with the mixing element or paddle 6 is a tab 7 which is adapted to be received between the flange 3 of bottom 2 and the adjacent sidewall 1. Whether or not this is done during the construction of the cup or afterwards, a tight joint may readily be effected in this manner between the tab and the cup structure.

As the tab and paddle structure is formed from paper board or similar material there is sufficient flexibility to make the tab, in effect, a hinged connection around which the paddle may be swung.

Integral with the paddle 6 on the opposite side of the same from tab 7 there is provided an elongated handle 8 which is adapted to extend upwardly to the upper open end of the cup. It will be apparent that the user, by holding the upper end of the handle 8 between his fingers, may readily reciprocate the handle vertically and thus impart a reciprocable swinging motion to the paddle 6 for mixing the contents of the container.

For the purpose of effecting additional agitation of the liquid in the container, holes 10 may, if desired, be provided in paddle 6. On the other hand, as shown in Fig. 7, the paddle 6 may be imperforate.

A charge of soluble material 15 may be provided on the bottom 2 of the cup (Fig. 1) in which case the paddle 6 serves as a cover for maintaining the material 15 in a sanitary condition. In such a case, upon addition of a suitable liquid, such as milk, hot water or carbonated water, the contents may readily be mixed and consumed without introducing any foreign material into the drink.

The present invention contemplates additional methods of providing the charge of soluble material. For example, the material 15 may be adherently secured to the underside of the paddle as indicated in Fig. 4, in which case the material is inserted in the same operation as the mixing device.

If a relatively tight seal is desired between the paddle and the cup to provide additional protection for the soluble contents, flaps 16 may be provided over holes 10. This may be readily accomplished by striking out all but a relatively small portion of the flaps 16 in the perforating process so that each flap 16 remains integrally secured to the paddle 6 along a small hinge portion. In such a case the additional mixing effect of the holes 10 is not impaired, as said flaps swing away from their corresponding holes during swinging of the paddle.

Although the upper end of handle 8 may be left free adjacent the top 9 of the container, some advantage in stacking a plurality of cups or other containers may be obtained by providing a slit or slot 18 in sidewall 1 adjacent the open end 9 so that the upper end of the handle 8 may be received therethrough as shown in Fig. 1. The slit or slot 18 thus acts as a guide and it is thereby possible to mix the contents of the container without any likelihood of the user's fingers touching the contents.

Fig. 6 illustrates another modification of the invention in which the handle 20 is made sufficiently long to be formed to a pair of loops 21, 22. The juncture 23 between said loops may be adherently secured to the sidewall 1 and the terminal portion 24 may be similarly secured. In such a case the lower loop 22 serves as a cup handle in the conventional manner and the upper loop 21, accessible to the thumb of the user, may be compressed so as to assume the dotted line position in Fig. 6. This action causes an upward swinging of the paddle as indicated, and by alternately compressing and releasing loop 21 the above described mixing action may be effected by the same hand that holds the cup.

Fig. 8 illustrates another method of swinging the paddle. In this case, a paddle 27 is hingedly secured to the bottom of the cup as before but in lieu of the semi rigid handle, a string 28 is secured at one end to the side of the paddle opposite the hinge connection. The other end of string 28 may be provided with a semi rigid tab 30 of any suitable material such as cardboard, which may be colored or otherwise coded to indicate the contents. In this case, the paddle 27 may be swung upwardly by pulling upwardly on string 28 by means of tab 30 and the inherent resiliency of the tab 26 is relied on to return the paddle to its lower position.

In addition to the elimination of the usual unhygienic wooden or metal spoon, the above described invention requires very little increased cost over the container itself. Stacking of the containers is not impaired in any way and the entire assembly may be disposed of when used.

The invention contemplates, not only the provision of a charge of powdered material of the like, but also a paddle that is impregnated with any desired flavor, such as chocolate, strawberry, etc. In such an event, the upper end of handle 8 may be colored any appropriate color as indicated at 32 to identify the contents.

It will be noted that the stirring element of the present invention is provided with a positive hinged support which gives it rigidity not present in previously suggested stirrers of the prior art.

The present invention also contemplates that the paddle may be struck from the inner layer of a double thickness sidewall which procedure has certain advantages insofar as manufacture is concerned. If the paddle is inserted in the container as a separate operation the hinge flap 7 (Fig. 2) may be bent upwardly and glued to the sidewall in which case the step of inserting the hinge tab between the sidewall and the bottom flange would be unnecessary. In any event the operation of the device is not affected.

The foregoing very specific descriptions of the preferred embodiments of the invention are not to be taken as restrictive of the same since it is obvious that variations in design may be resorted to without departing from the spirit of the invention.

I claim:

1. In a paper cup having an open top, a circular bottom and frusto-conical sidewalls extending upwardly from said bottom with the marginal portion of said bottom formed with a downwardly extending flange and with the lower margin of said sidewalls crimped upwardly around said flange to form a liquid tight seal, a stirring device for stirring liquid in said cup comprising: a paddle positioned over said bottom and formed with a downwardly extending tab interposed between said flange and the adjacent portion of said sidewalls for hingedly securing said paddle to said cup, a handle secured to said paddle at the side of the latter opposite said tab and extending upwardly toward said open end whereby vertical swinging of said paddle is effected by movement of said handle.

2. In a paper cup having an open top, a circular bottom and frusto-conical sidewalls extending upwardly from said bottom with the marginal portion of said bottom formed with a downwardly extending flange and with the lower margin of said sidewalls crimped upwardly around said flange to form a liquid tight seal, a stirring device for stirring liquid in said cup comprising: a paddle positioned over said bottom and formed with a downwardly extending tab interposed between said flange and the adjacent portion of said sidewalls for hingedly securing said paddle to said cup, a handle secured to said paddle at the side of the latter opposite said tab and extending upwardly toward said open end whereby vertical swinging of said paddle is effected by movement of said handle, a charge of soluble material interposed between said bottom and said paddle and adapted to be mixed with liquid in said cup upon movement of said paddle.

3. In a container having an open top, a bottom, and sidewalls extending upwardly from said bottom to said open top, a mixing element for mixing the contents of said container comprising: a paddle overlying said bottom, a vertically extending handle integrally secured to said paddle at its lower end and extending at its upper end to a point adjacent said open top, a tab integral with said paddle on the side of the latter opposite the side at which said handle is connected and secured in face contact to said container to provide a hinge to permit swinging said paddle vertically relative to said container, said paddle, handle and tab being formed from a unitary sheet of semi-rigid sheet material to provide hinging action between said paddle and said tab and handle during vertical reciprocation of said handle.

4. In a container having an open top, a bottom, and sidewalls extending upwardly from said bottom to said open top, a mixing element for mixing the contents of said container comprising: a paddle overlying said bottom, a vertically extending handle integrally secured to said paddle at its lower end and extending at its upper end to a point adjacent said open top, a tab integral with said paddle on the side of the latter opposite the side at which said handle is connected and secured in face contact to said container to provide a hinge to permit swinging said paddle vertically relative to said container, said paddle, handle and tab being formed from a unitary sheet of semi-rigid sheet material to provide hinging action between said paddle and said tab and handle during vertical reciprocation of said handle, and a charge of soluble material interposed between said paddle and said bottom.

5. In a container having an open top, a bottom, and sidewalls extending upwardly from said bottom to said open top, a mixing element for mixing the contents of said container comprising: a paddle overlying said bottom, a vertically extending handle secured to said paddle at its lower end and extending at its upper end to a point adjacent said open top, said paddle being formed of semi-rigid sheet material and provided with a line of weakness constituting a hinge, the portion of said paddle on the side of said line of weakness opposite the handle being fixedly secured to said container to permit swinging the remainder of said paddle about said hinge by said handle, the lateral extent of said paddle being less than the inner cross sectional area of said container to permit free swinging of said paddle relative to said sidewalls.

6. In a container having an open top, a bottom, and sidewalls extending upwardly from said bottom to said open top, a mixing element for mixing the contents of said container comprising: a paddle overlying said bottom, a vertically extending handle secured to said paddle at its lower end and extending at its upper end to a point adjacent said open top, said paddle being formed of semi-rigid sheet material and provided with a line of weakness constituting a hinge, the portion of said paddle on the side of said line of weakness opposite the handle being fixedly secured to said container to permit swinging the remainder of said paddle about said hinge by said handle, said paddle being free from engagement with said sidewalls along its periphery except at the point at which it is secured to said container to permit free swinging of said paddle relative to said sidewalls.

References Cited in the file of this patent

UNITED STATES PATENTS

| | | |
|---|---|---|
| 386,488 | Myers | July 24, 1888 |
| 1,709,168 | Epperson | Apr. 16, 1929 |
| 1,770,118 | Williams | July 8, 1930 |
| 1,889,111 | Serr | Nov. 29, 1932 |
| 1,933,468 | Abbot | Oct. 31, 1933 |
| 2,540,565 | Barbieri | Feb. 6, 1951 |
| 2,584,008 | Fioretti | Jan. 29, 1952 |
| 2,661,889 | Phinney | Dec. 8, 1953 |

FOREIGN PATENTS

| | | |
|---|---|---|
| 545,127 | Germany | Feb. 25, 1932 |
| 1,025,543 | France | Jan. 28, 1953 |